United States Patent
Hemstock et al.

(10) Patent No.: US 7,383,958 B2
(45) Date of Patent: *Jun. 10, 2008

(54) DESANDING APPARATUS AND SYSTEM

(75) Inventors: Christopher A Hemstock, Calgary (CA); Bruce G Berkan, Calgary (CA); Kevin D Price, Calgary (CA)

(73) Assignee: Specialized Tech Inc, Calgary (CA)

( * ) Notice: Subject to any disclaimer, the term of this patent is extended or adjusted under 35 U.S.C. 154(b) by 52 days.

This patent is subject to a terminal disclaimer.

(21) Appl. No.: 11/164,675

(22) Filed: Dec. 1, 2005

(65) Prior Publication Data

US 2006/0289353 A1 Dec. 28, 2006

Related U.S. Application Data

(62) Division of application No. 10/668,266, filed on Sep. 24, 2003, now Pat. No. 6,983,852.

(30) Foreign Application Priority Data

Oct. 10, 2002 (CA) .................................... 2407554
Jun. 27, 2003 (CA) .................................... 2433741

(51) Int. Cl.
*B01D 21/24* (2006.01)
(52) U.S. Cl. ................... 210/519; 210/532.1; 210/539; 210/537; 96/184; 166/75.12; 239/600; 285/412; 285/148.28
(58) Field of Classification Search ............... 210/519, 210/539, 540, 541, 532.1, 537; 95/253; 96/182, 96/183, 184; 166/75.12, 267; 285/148.28, 285/390, 412; 239/600, 587.1
See application file for complete search history.

(56) References Cited

U.S. PATENT DOCUMENTS

| | | | | |
|---|---|---|---|---|
| 1,043,364 A | * | 11/1912 | Schuermann | 285/148.28 |
| 1,268,359 A | * | 6/1918 | Jordan et al. | 239/600 |
| 1,601,611 A | | 9/1926 | Downey | |
| 1,702,612 A | | 2/1929 | Morse | |
| 1,851,030 A | | 3/1932 | Adams | |
| 1,947,201 A | * | 2/1934 | Hacker | 239/587.1 |
| 2,049,068 A | | 7/1936 | Loupe | |
| 2,058,044 A | | 10/1936 | Spencer | |
| 2,228,401 A | | 1/1941 | Pressler | |
| 2,547,190 A | | 4/1951 | Wilson | |
| 2,610,697 A | | 9/1952 | Lovelady | |
| 2,664,963 A | | 1/1954 | Lovelady | |
| 2,706,531 A | | 4/1955 | Lovelady | |
| 2,751,998 A | | 6/1956 | Glasgow | |
| 3,192,967 A | * | 7/1965 | White, Jr. et al. | 239/600 |

(Continued)

FOREIGN PATENT DOCUMENTS

EP 0 208 981 B1 3/1991

*Primary Examiner*—Christopher Upton
(74) *Attorney, Agent, or Firm*—Sean W. Goodwin

(57) ABSTRACT

A desanding vessel is inserted in a high velocity fluid stream containing entrained particulates. The vessel comprises an upper freeboard portion having a large cross-sectional wherein the fluid stream velocity drops and particulates fall from suspension. Preferably the fluid stream is introduced offset upwardly from an axis of a horizontally oriented cylindrical vessel, released particulates falling to accumulate in a lower belly portion. The freeboard portion is maintained using a depending flow barrier adjacent the vessel's outlet which sets the depth of accumulation in the belly portion. A cleanout enables periodic removal of accumulations.

16 Claims, 5 Drawing Sheets

U.S. PATENT DOCUMENTS

| | | | |
|---|---|---|---|
| 3,255,571 | A | 6/1966 | Walker |
| 3,273,318 | A | 9/1966 | Meyer |
| 3,310,109 | A | 3/1967 | Marx |
| 3,331,188 | A | 7/1967 | Sinex |
| 3,396,512 | A | 8/1968 | McMinn |
| 3,426,904 | A | 2/1969 | Katsua |
| 3,553,940 | A | 1/1971 | Piner |
| 3,574,096 | A | 4/1971 | Carlstedt |
| 3,852,192 | A | 12/1974 | Fassell |
| 4,073,734 | A | 2/1978 | Lowrie |
| 4,122,009 | A | 10/1978 | Tao |
| 4,208,196 | A | 6/1980 | Coggins |
| 4,238,333 | A | 12/1980 | Tidwell |
| 4,257,895 | A | 3/1981 | Murdock |
| 4,539,023 | A | 9/1985 | Boley |
| 4,617,031 | A | 10/1986 | Suh |
| 4,673,500 | A | 6/1987 | Hoofnagle |
| 4,721,565 | A | 1/1988 | Carroll |
| 4,778,494 | A | 10/1988 | Patterson |
| 4,975,205 | A | 12/1990 | Sloan |
| 5,064,448 | A | 11/1991 | Choi |
| 5,173,194 | A | 12/1992 | Hering |
| 5,245,057 | A | 9/1993 | Shirtum |
| 5,295,537 | A | 3/1994 | Trainer |
| 5,333,917 | A * | 8/1994 | Davey et al. ............... 285/412 |
| 5,500,039 | A | 3/1996 | Mori |
| 5,522,999 | A | 6/1996 | Broussard |
| 5,582,271 | A | 12/1996 | Mielo |
| 5,599,507 | A | 2/1997 | Shaw |
| 5,827,357 | A | 10/1998 | Farion |
| 5,900,137 | A | 5/1999 | Homan |
| 5,928,519 | A | 7/1999 | Homan |
| 6,099,743 | A | 8/2000 | Pedersen |
| 6,119,779 | A | 9/2000 | Gipson et al. |
| 6,158,512 | A | 12/2000 | Unsgaard |
| 6,189,617 | B1 | 2/2001 | Sorhus et al. |
| 6,214,092 | B1 | 4/2001 | Odom et al. |
| 6,214,220 | B1 | 4/2001 | Favret |
| 6,269,880 | B1 | 8/2001 | Landry |
| 6,409,808 | B1 | 6/2002 | Chamberlain |
| 6,419,730 | B1 | 7/2002 | Chavez |
| 6,537,458 | B1 | 3/2003 | Polderman |
| 6,783,683 | B2 | 8/2004 | Collings |
| 2004/0184976 | A1 | 9/2004 | Pagani |

* cited by examiner

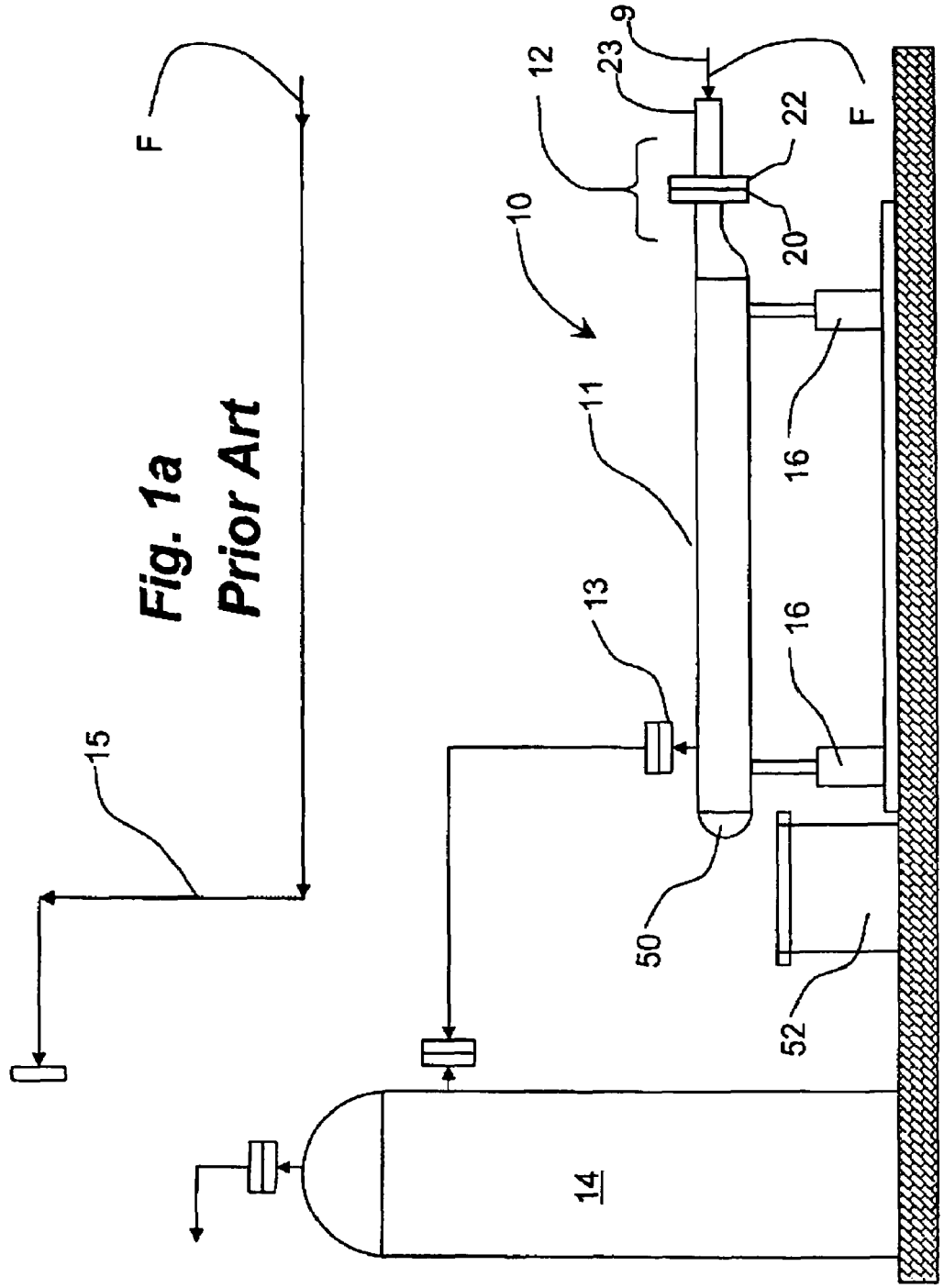

DESANDING APPARATUS AND SYSTEM

CROSS REFERENCE TO RELATED APPLICATION

This application is a divisional application of U.S. application Ser. No. 10/668,266 filed Sep. 24, 2003 now U.S. Pat. No. 6,983,852 and claiming priority of U.S. Provisional application 60/417,146 filed Oct. 10, 2002 and of prior foreign applications namely, Canadian Patent Application 2,407,554 filed Oct. 10, 2002 and Canadian Patent Application 2,433,741 filed Jun. 27, 2003.

FIELD OF THE INVENTION

The present invention relates to a system and apparatus for the removal of particulates such as sand from fluid streams produced from a well while minimizing abrasion of the involved equipment.

BACKGROUND OF THE INVENTION

Production from wells in the oil and gas industry often contain particulates such as sand. These particulates could be part of the formation from which the hydrocarbon is being produced, introduced particulates from hydraulic fracturing or fluid loss material from drilling mud or fracturing fluids or from a phase change of produced hydrocarbons caused by changing conditions at the wellbore (Asphalt or wax formation). As the particulates are produced, problems occur due to abrasion, and plugging of production equipment. In a typical startup after stimulating a well by fracturing, the stimulated well may produce sand until the well has stabilized, often up to a month after production commences. Other wells may require extended use of the desander 10.

In the case of gas wells, fluid velocities can be high enough that the erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to service personnel. Release to the environment is damaging to the environment resulting in expensive cleanup and loss of production. Repair costs are also high.

In all cases, retention of particulates contaminates both surface equipment and the produced fluids and impairs the normal operation of the oil and gas gathering systems and process facilities.

In one prior art system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

An alternate known prior art system includes employing filters to remove particulates. A common design is to have a number of fiber-mesh filter bags placed inside a pressure vessel. The density of the filter bag fiber-mesh is matched to the anticipated size of the particulates. Filter bags are generally not effective in the removal of particulates in a multiphase conditions. Usually multiphase flow in the oil and gas operations is unstable. Large slugs of fluid followed by a gas mist is common. In these cases, the fiber bags become a cause a pressure drop and often fail due to the liquid flow therethrough. Due to the high chance of failure, filter bags may not be trusted to remove particulates in critical applications or where the flow parameters of a well are unknown. An additional problem with filter bags in most jurisdictions is the cost associated with disposal. The fiber-mesh filter bags are considered to be contaminated with hydrocarbons and must be disposed of in accordance to local environmental regulation.

Clearly there is a need for more versatile and cost effective system of particulate handling.

SUMMARY OF THE INVENTION

Desanding apparatus is provided which is placed adjacent to a well's wellhead for intercepting a fluid stream flow before prior to entry to equipment including piping, separators, valves, chokes and downstream equipment. The fluid stream can contain a variety of phases including liquid, gas and solids.

In one embodiment, a pressure vessel is inserted in the flowsteam by insertion into high velocity field piping extending from the wellhead. The vessel contains an upper freeboard portion having a cross-sectional area which is greater that of the field piping from whence the fluid stream emanates. As a result, fluid stream velocity drops and particulates cannot be maintained in suspension. A cross-sectional area of the freeboard portion is maintained through a downcomer flow barrier adjacent the vessel's exit.

In a broad aspect, desanding apparatus vessel for removal of particulates from a fluid stream containing particulates comprises: a fluid inlet adjacent a first end of the vessel and adapted for receiving the fluid stream, the fluid inlet discharging the fluid stream at an inlet velocity into a freeboard portion at a top of the vessel, the fluid stream in the freeboard portion having an elutriation velocity less than the inlet velocity and such that contained particulates have a fall trajectory; a fluid outlet from the vessel, the outlet being spaced horizontally from the inlet; and a flow barrier depending from the top of the vessel and having a lower edge so as to direct the fluid stream below the barrier before discharge from the outlet port for maintaining the freeboard portion above the lower edge and forming a belly storage portion below the lower edge, the flow barrier being positioned between the fluid inlet and fluid outlet and the flow barrier being spaced from the fluid inlet so as to enable the fall trajectory of a substantial amount of the particulates to intersect the belly portion so as accumulate particulates in the belly portion prior to the flow barrier wherein the fluid stream at the fluid outlet is substantially free of particulates.

Preferably, the flow barrier is a depending weir independent of the outlet, or could be formed by the outlet itself. A cleanout port is preferably included for periodic removal of accumulations of particulates.

More preferably, a vessel of an embodiment of the present invention is incorporated in a desanding system to replace existing prior connective piping, the vessel being supported using structure to align the vessel with the wellhead piping and downstream equipment.

BRIEF DESCRIPTION OF THE DRAWINGS

FIG. 1a is a schematic arrangement of connective wellsite piping of the prior art;

FIG. 1b is a schematic arrangement of one embodiment of the invention having been installed in place of the prior connective wellsite piping of FIG. 1a;

DETAILED DESCRIPTION OF THE PREFERRED EMBODIMENT

Figure 3:
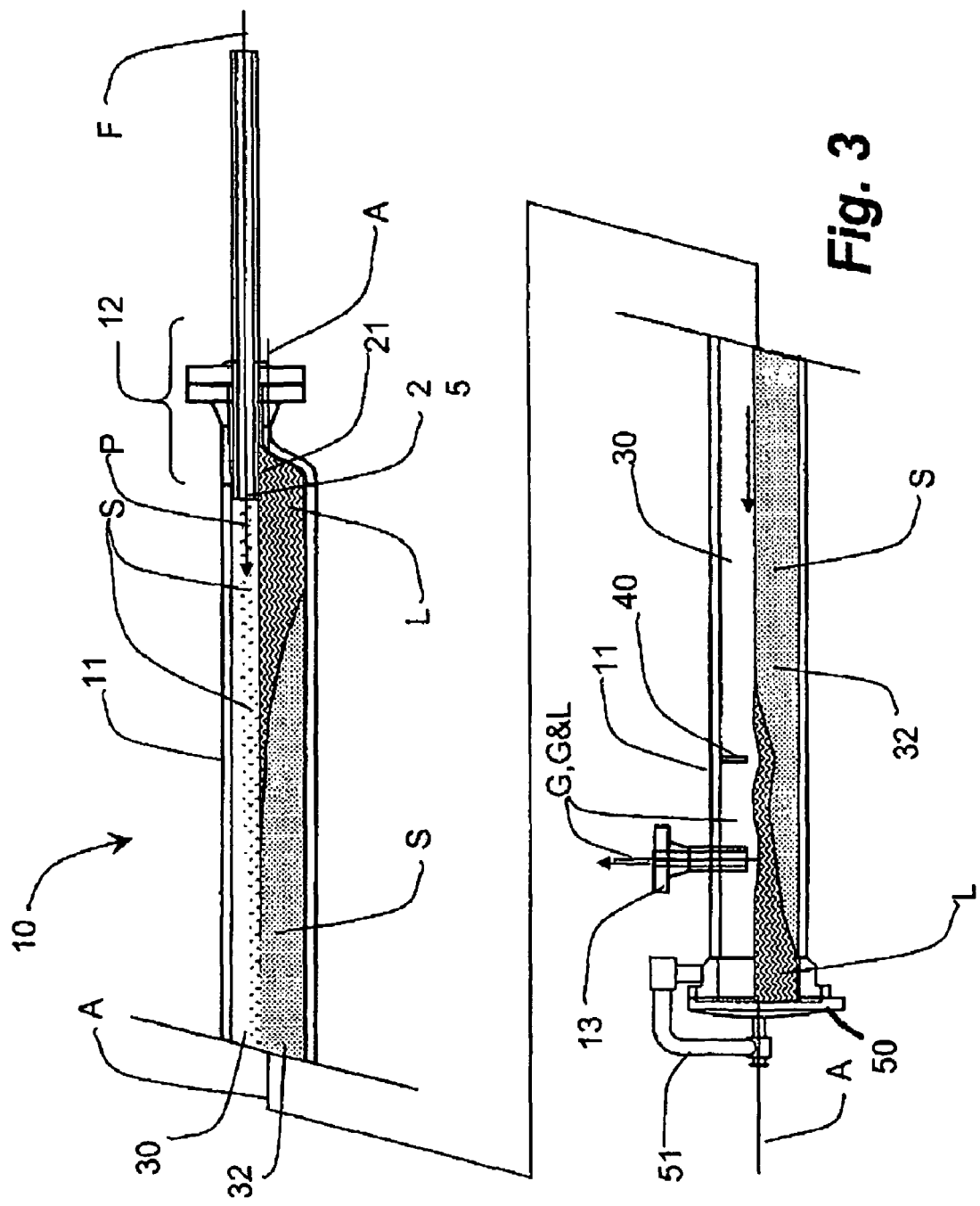
FIG. 3 is a cross-sectional side view of one embodiment of the invention illustrating fluid streams, falling trajectory of particulates, and accumulations of separated liquid, particulates and particulate-free fluid discharge.

As shown in FIGS. 1b and 3, a desander 10 comprises a substantially horizontal, cylindrical pressure vessel 11 having a first fluid inlet end 12 adapted for connection to a fluid stream F such as from wellhead piping 9 and a fluid outlet 13 connected to downstream equipment 14 such as multiphase separators. The fluid stream F typically comprises a variety of phases including gas G, some liquid L and entrained particulates such as sand S. The fluid stream emanating from the fluid outlet 13 is typically liquid L and gas G, with a substantial portion of the particulates S being captured by the desander 10. As a system, the desander 10 is typically inserted as a replacement for existing piping 15 (shown in FIG. 1a). The desander 10 is preferably supported with structure 16 such as elevation adjustable jacks to align the desander 10 relative to the existing wellhead piping 9 and downstream equipment 14.

Figure 2A:
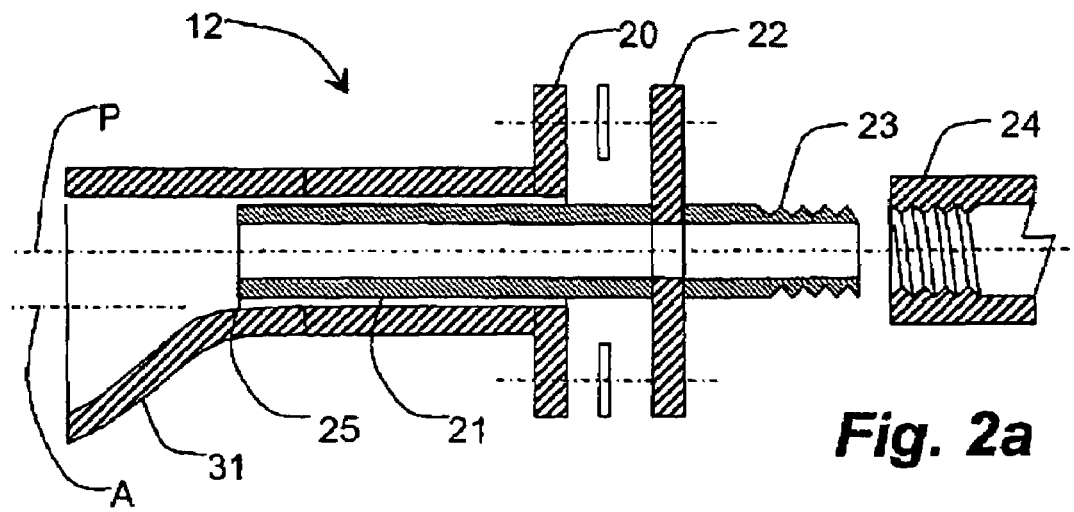
FIG. 2a is an exploded view of the inlet to one embodiment of the vessel of the invention which illustrates a nozzle arrangement in an eccentric vessel inlet.
Figure 2B:
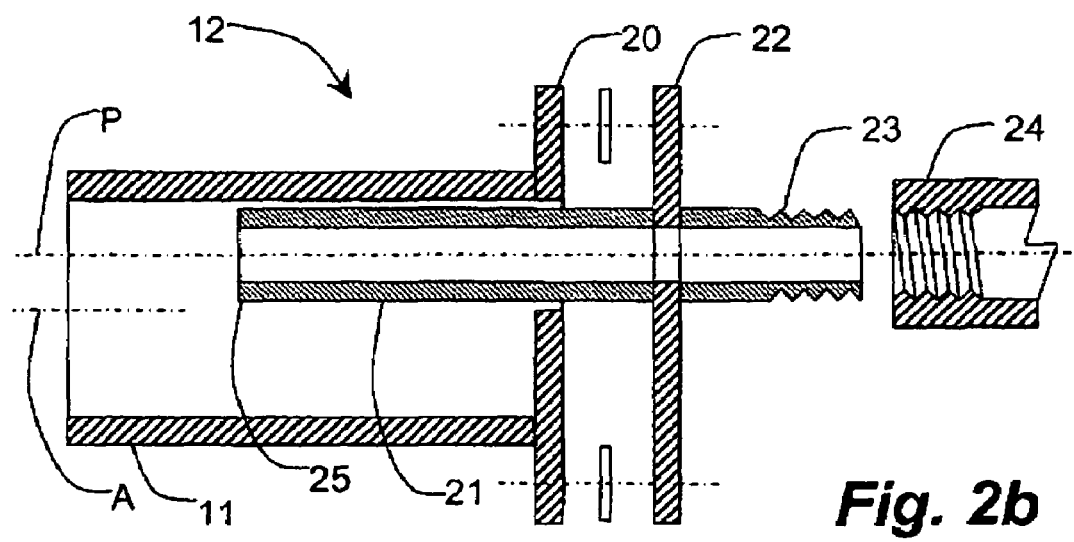
FIG. 2b is an exploded view of the inlet to one embodiment of the vessel of the invention which illustrates a nozzle arrangement adapted to a blind flange.

With reference to FIGS. 2a and 2b, the inlet 12 is fitted with a first connector or inlet flange 20 so as to better facilitate installation, to allow easy inspection for wear, to minimize equipment erosion and to simplify replacement when erosion has reduced material thicknesses to acceptable minimums. A nozzle 21 and a second connector or a nozzle flange 22 are adapted for complementary and sealed connection to the inlet flange 20. Typically, the nozzle 21 has a threaded inlet 23 which is adapted for threaded connection to an existing coupling 24 from the wellhead piping 9. The nozzle inlet 23 is threaded onto the coupling 24 and the vessel and inlet 12 is positioned over the nozzle 21 and the flanges 20,22 are connected.

In greater detail as shown in FIGS. 2a,2b and 3, the nozzle 21 has a protruding discharge portion 25 which extends adjacent the top of the vessel 11. The inlet 12 is offset upwardly from an axis A of the vessel 11 and extends into an upper freeboard portion 30. Preferably, as shown in FIG. 2a, an eccentric fitting 31 is applied to the inlet 12. When coupled with the inlet flange 20 on the eccentric fitting 31, the nozzle 21 is shifted upwardly from an axis A of the vessel 11. Similarly, as shown in FIG. 2b, the nozzle 21 can extend through a large blind inlet flange 20 fit directly to the vessel 11 positioned so as to be shifted upwardly from an axis A of the vessel 11. The nozzle 21 discharges the fluid stream F along the nozzle's axis, a path P, substantially parallel to the vessel's axis A. The nozzle inlet 23 is typically formed of heavy-wall piping to extend its operational life in the abrasive environment of the particulate laden fluid stream F. Further, the nozzle's discharge 25 protrudes into the vessel 11 sufficiently to extend beyond the inlet 12 and into the freeboard portion 30, thereby aiding in minimizing localized wear on the less easily replaced inlet 12, or eccentric fitting 31, of the vessel 11

In FIG. 3, the desander 10 further comprises belly portion 32, formed below the freeboard portion 30, for receiving and temporarily storing liquids L and sand S which separate from the fluid stream F. The fluid stream F containing sand S enters through the inlet 12 and is received by a larger cross-sectional area and substantially gas-phase volume of the freeboard portion 30. Accordingly, the velocity of the fluid stream F slows to a point below the entrainment or elutriation velocity of at least a portion of the particulates S in the fluid stream. Those of skill in the art are able to determine and apply the parameters of the fluid stream F, fluid stream velocity and those of the particulates S so as to determine the elutriation characteristics. As the area of the freeboard portion 30 increases, the velocity of the fluid stream F slows and a lesser fraction of the particulates remain entrained; a greater fraction of particulates S falling out of suspension from the fluid stream F. The particulates S are discharged horizontally from the nozzle 21 along path P, and as they fall from suspension, they adopt a downwardly curved trajectory under the influence of gravity. Preferably, to avoid impingement-type erosion, the length of the vessel is sufficient to permit the particulates to fall out of suspension before impinging internals of the vessel 11. Given sufficient horizontal distance without interference, the particulates S eventually fall from the freeboard portion 30 and the trajectory intersects with the belly portion 32. The particulates S deposit and accumulate over time in the belly portion 32. Typically, liquids L from the fluid stream also collect in the vessel's belly portion 32.

The freeboard portion 30 is maintained using means such as a depending flow barrier 40 to ensure that the collected liquids L and particulates S only reach a maximum depth in the belly portion 32 of the vessel 11. A minimum cross-section area of the freeboard portion and preferred length of the freeboard portion 30 are determinable based on the elutriation characteristics and are established so as to maximize release of the particulates S before they reach the outlet 13. The greater the length or spacing between the inlet 12 and the flow barrier 40, the greater is the opportunity to drop and release entrained particulates S.

Typically, liquid L out of the fluid stream F accumulates in the belly portion 32 to a steady state level and then is re-entrained for discharge with fluids exiting the outlet 13 without affecting the capability of the vessel 11 and belly portion 32 to continue to accumulate particulates S. Regardless of dropout of liquids L from gas G and collection of liquid L in the vessel 11, this upper freeboard portion 30 remains substantially gas-filled. However, should a maximum depth of particulates S be reached during operation and encroach on the freeboard portion 30, operations may yet continue as if the vessel 11 were not even installed; both incoming liquid L and particulates S being temporarily re-entrained with the fluid stream flowing from the vessel outlet 13 until the earliest opportunity to perform maintenance. Typically the belly portion 32 vessel 11 is periodically cleaned out or emptied of accumulated particulates and liquid at sufficient intervals to ensure that the maximum accumulated depth does not encroach on the freeboard portion 30. Maintenance and operations personnel are further able to physically view sand production volumes during the cleanout and inspection.

The flow barrier 40 depends downwardly from the top of the vessel 11. The flow barrier 40 has a lower edge 41 which sets the maximum depth of the belly portion 32. As discussed above, the flow barrier 40 is preferably spaced sufficiently from the inlet 11 to enable the fall trajectory of the particles to intersect the belly portion 32 before impinging on the flow barrier 40 itself.

Figure 4A:
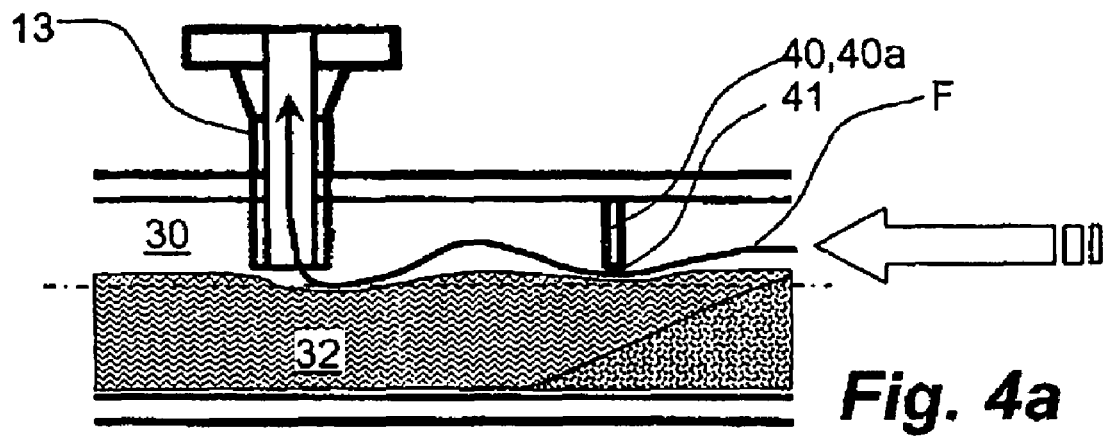
FIGS. 4a through 4c illustrate a variety of optional flow barriers applied at the fluid outlet.
Figure 4B:
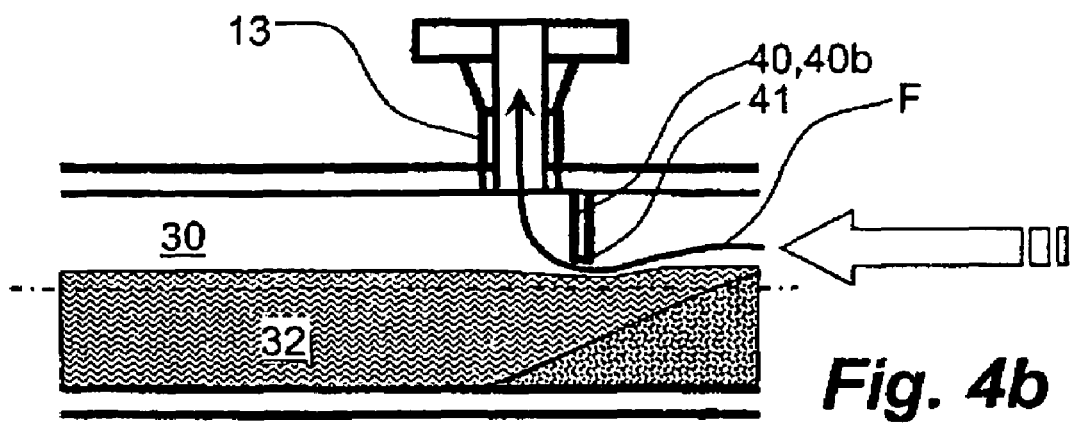
Figure 4C:
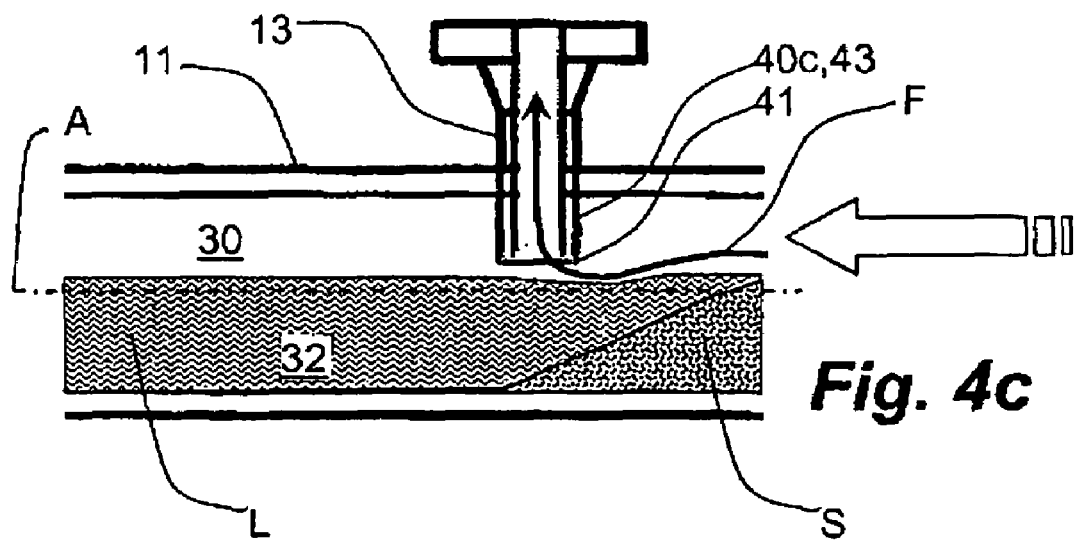

As shown in FIGS. 4a-4c, the flow barrier 40 can comprise a discrete or separate plate 40a,40b as shown in FIGS. 4a and 4b, spaced from the outlet 13, or as shown in FIG. 4c, a flow barrier 40c can be formed by the outlet 13 itself. All of the various flow barriers 40,40a,40b,40c have a lower edge 41 which forces the fluid stream S thereunder before discharging from the vessel 11 at outlet 13. Accumulated levels L,S encroaching above the lower edge 41 will result in high velocities and re-entrainment of liquids L and particulates S from the area about the flow barrier 40, inherently resulting in a steady state maximum level of accumulation of the belly portion 32.

In the embodiment shown in some detail in FIG. 4c, the outlet 13 itself acts as the flow barrier 40, which incorporates a tubular portion 43 protruding downwardly and depending through the freeboard portion 30. The tubular portion 43 also has a lower edge 41 spaced from the top of the vessel 11 which forces the fluid stream F to exit from a point nearer the vessel axis A. Particulate-free fluid, typically being gas G and some liquid L, is collected about the axis A for discharge through the discharge tubing 40 and outlet 13. An advantage of providing a separate flow barrier 40,40a,40b is that any abrasion and erosion is borne by the barrier 40 and not by the outlet's 13 tubular portion 43.

As shown in FIGS. 4a,4c, the outlet 13 for the vessel 10 is preferably arranged perpendicular to the axis A of the vessel 10 for further inertial rejection of re-entrained particulates S.

Referring once again to FIG. 3, a quick release pressure-vessel compatible cleanout 50 is provided for access to the vessel 11 for cleanout of the accumulated particulates. The vessel must be depressurized before opening and cleaning out particulates. Typically, mechanically-interlocked safety means 51 are provided so that the vessel must be depressurized before the cleanout can be opened. For depressurization, the vessel is isolated from the fluid stream F and pressure is bled off from the freeboard portion 30 until the cleanout 50 be removed. As shown in FIG. 1b, a catch basin 52 or other suitable collection means is provided for accepting the collected liquid L and particulates S. Manual cleanout is performed although automated cleanout could be incorporated without diverging from the intent of the invention.

EXAMPLES

A typical vessel according to the present invention, and for reference are roughly approximated by the proportions of FIG. 3, can be a 6" or an 8" diameter. Using an 8" diameter, schedule 160 shell for the vessel 11 can result in a fluid stream capacity of about 8 million cubic feet of gas per day. A 2" schedule 160 inlet nozzle extends about 1" beyond an eccentric inlet 12 and into the vessel 11. With a flow barrier 40 placed about 8 feet from the nozzle discharge 25, the desander 10 achieved a corresponding and typical collection rate of 1.5 gallons of sand particulates per day, determined in a worst case scenario of particles of about 100 mesh. Applied to problem wells in several exceptional cases, using no vessel at all, one prior art wellhead, piping and equipment experienced four breaches and in another case, seven breaches. After installation of a preferred vessel of the present invention, no further breaches were experienced. In one case, the resulting collection of particulates, as sand, was about 5 liters per day.

Figure 5:
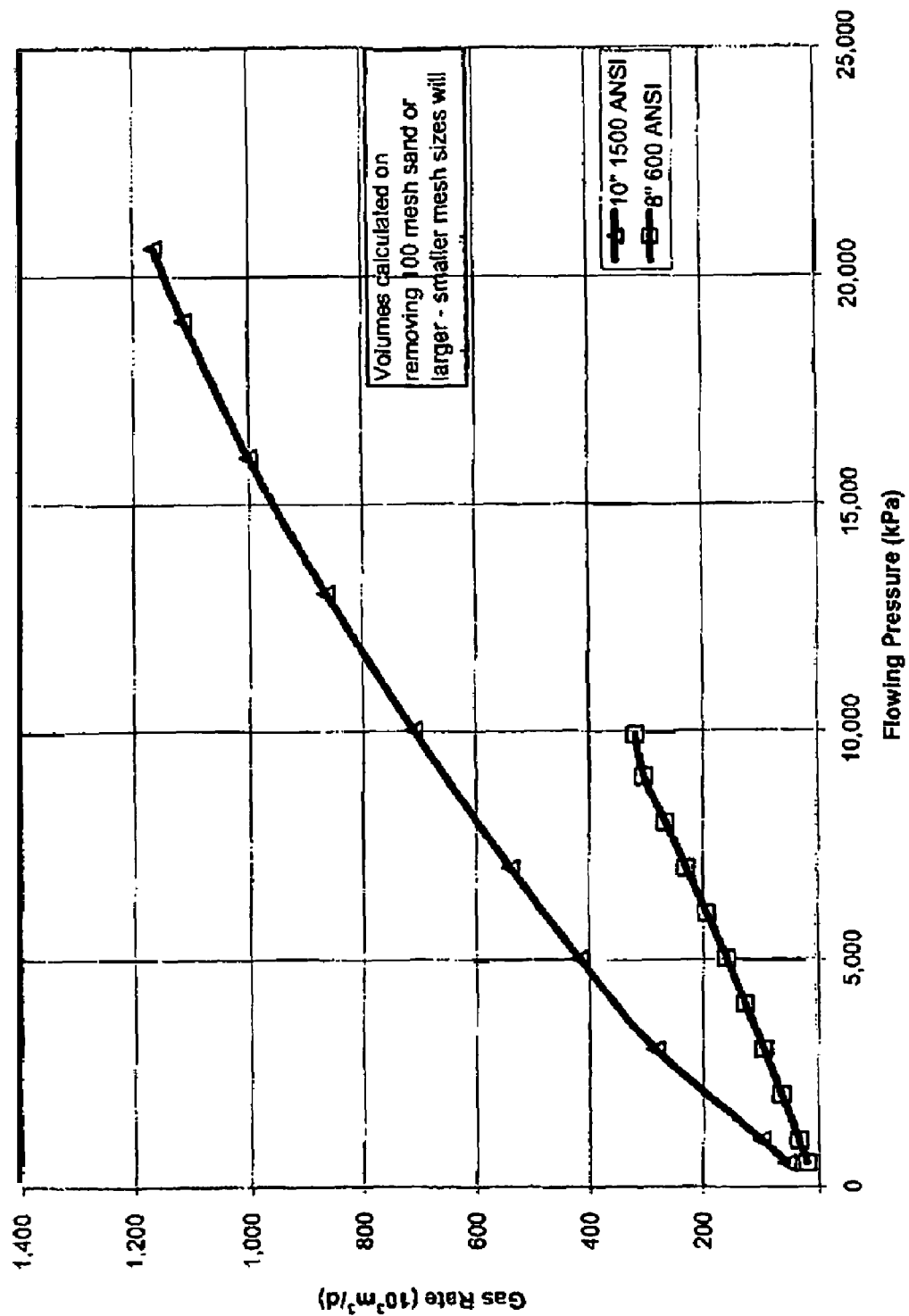
FIG. 5 is a performance graph of the achievable gas throughout rates at various pressures while still achieving particulate removal for a pessimistic case of a fluid stream containing fine 100 mesh sand.

Further, as shown in FIG. 5, the throughput capability of 8 inch and 10 inch diameter desanding vessels are illustrated for a variety of fluid pressures.

A system incorporating a desanding apparatus according to one of the embodiments disclosed herein will benefit from advantages including: As a desander 10 is more cost effective than a "P Tank", the desander can be economically placed on a wellsite for long term sand protection (substantially permanent as required); with a pressure rating that allows the vessel to operate at the wellhead conditions, minimal pressure drop is experienced across the vessel; the desander is designed to exceed ASME code for pressure vessels; sand is removed from the fluid stream without erosive effects on the operator's downstream equipment and; as the vessel is passive, having no moving parts, plugging from particulates is not an issue; sand can be removed simply and mechanically from the vessel at regular intervals; by removing the sand prior to it entering the producing system, contamination of equipment and produced fluids is avoided; and the desander is capable of handling multiphase production and has demonstrated an ability to remove sand from both gas and oil streams. This results in a wider application than prior art filter methods.

What is claimed is:

1. In a horizontal, cylindrical desanding vessel having a vessel inlet adjacent a first end of the vessel for receiving a fluid stream containing particulates, the fluid inlet discharging the fluid stream at an inlet velocity into a freeboard portion at a top of the vessel, the fluid stream in the freeboard portion having an elutriation velocity less than the inlet velocity such that the contained particulates have a fall trajectory therein and a fluid outlet from the freeboard being spaced horizontally from the inlet, the improvement comprising a nozzle comprising:
    an inlet formed at a first end of the nozzle for connection to a source of the fluid stream; and
    a protruding discharge formed at a second end of the nozzle which when connected to the vessel inlet, extends sufficiently from the vessel inlet for discharging the fluid stream into the freeboard portion of the vessel away from the vessel inlet so as to minimize erosion thereto,
    wherein the fluid stream is discharged along a path being substantially parallel to a vessel axis for discharge of the fluid stream and particulates into the freeboard portion of the vessel.

2. The nozzle of claim 1 wherein the vessel inlet further comprises a first connector, the nozzle further comprising:
    a nozzle flange adapted for connecting to the first connector.

3. The nozzle of claim 2 wherein the first connector is an inlet flange.

4. The nozzle of claim 2 wherein the first connector is a blind inlet flange fit to the vessel for shifting the nozzle upwardly from the vessel's axis.

5. The nozzle of claim 1 further comprising:
an eccentric fitting applied to the vessel's inlet and positioned between the vessel inlet and a first connector for aligning the nozzle offset above the vessel's axis.

6. The nozzle of claim 5 wherein the first connector is an inlet flange.

7. The nozzle of claim 5 wherein the first connector is a blind inlet flange fit to the vessel for shifting the nozzle upwardly from the vessel's axis.

8. The nozzle of claim 1 wherein the nozzle is replaceably connected to the vessel inlet.

9. The nozzle of claim 1 wherein the first end of the nozzle is threaded for connection to the source of the fluid stream.

10. A replaceable nozzle system for a horizontal, cylindrical desanding vessel comprising, in combination:
a horizontal, cylindrical desanding vessel having a vessel inlet adjacent a first end of the vessel for receiving a fluid stream containing particulates, the fluid inlet discharging the fluid stream at an inlet velocity into a freeboard portion at a top of the vessel, the fluid stream in the freeboard portion having an elutriation velocity less than the inlet velocity such that the contained particulates have a fall trajectory therein and a fluid outlet from the freeboard being spaced horizontally from the inlet; and
a nozzle comprising:
an inlet formed at a first end of the nozzle for connection to a source of the fluid stream; and
a protruding discharge formed at a second end of the nozzle so as when connected to the vessel inlet the protruding discharge extends sufficiently outwardly from the vessel inlet for discharging the fluid stream into the freeboard portion of the vessel away from the vessel inlet so as to minimize erosion thereto,
wherein the fluid stream is discharged along a path being substantially parallel to a vessel axis for discharge of the fluid stream and particulates into the freeboard portion of the vessel.

11. The nozzle system of claim 10 wherein the vessel inlet further comprises a first connector and the nozzle further comprises a nozzle flange for connecting to the first connector.

12. The nozzle of claim 11 wherein the first connector is an inlet flange.

13. The nozzle of claim 11 wherein the first connector is a blind inlet flange fit to the vessel for shifting the nozzle upwardly from the vessel's axis.

14. The nozzle system of claim 10 further comprising:
an eccentric fitting applied to the vessel's inlet and positioned between the vessel inlet and a first connector for aligning the nozzle offset above the vessel's axis.

15. The nozzle of claim 14 wherein the first connector is an inlet flange.

16. The nozzle of claim 14 wherein the first connector is a blind inlet flange fit to the vessel for shifting the nozzle upwardly from the vessel's axis.

* * * * *